UNITED STATES PATENT OFFICE.

DENNIS C. GATELY, OF NEWTOWN, CONNECTICUT.

IMPROVEMENT IN RUBBER BELTING.

Specification forming part of Letters Patent No. 26,177, dated November 22, 1859.

*To all whom it may concern:*

Be it known that I, DENNIS C. GATELY, of Newtown, in the county of Fairfield and State of Connecticut, have invented a new and useful Improvement in Machine Belting or Banding made of India-Rubber or Gutta-Percha; and I do hereby declare that the following is a true and exact description of the same, wherein I have set forth the nature and principles of my improvements, by which my invention may be distinguishable from all others of a similar class, together with such parts as I claim and desire to have secured to me by Letters Patent.

My invention consists of an improvement in machine belting or banding made of india-rubber or gutta-percha, which produces a new and superior friction-surface, gives much greater power, and is applicable to most kinds of belts or bands.

I can best illustrate this invention by a description of the difference between india-rubber belts made in the old method and those made in my new method.

The surface of ordinary india-rubber belts, owing the mode in which they are manufactured, is rough and covered with irregularities. This roughness was originally supposed to be useful, but it is, on the contrary, a disadvantage, and the more perfectly smooth and polished the surface of the belt is made, the more perfect is the friction, and the less is the loss of the driving power. I therefore make my new belt with a perfectly smooth surface, and thus no air is admitted between the belt and the pulley to lessen the friction. I have discovered a method of making a smooth, elastic surface, which method is the subject of an application for separate Letters Patent.

I make my new belting and banding of india-rubber, gutta-percha, or other substances which are employed for the purpose, and are capable of having a perfectly smooth friction-surface. This friction-surface is wholly new and is very useful, it produces a great saving of power, and also gives greater steadiness and evenness of motion to the machinery which is driven by it.

A comparison of my new belts with all other belts, will show at once the entire novelty and superiority of my invention.

Among the modes by which my improved belting or banding may be made are the following: The belt is passed between two long metallic plates, covered with hollow casings or steam-jackets, and fed along as fast as vulcanized. The process that I prefer, and from which I have obtained the best results, and which will form the subject of a separate application for Letters Patent, I will now describe.

I take thin sheets of flexible metal of the width of the belt, and of the same length, and roll the sheets of metal and the belt up tightly together on a mandrel. This may be done by hand or by a machine which I have made for the purpose. The belt thus held and pressed between the sheets of metal, is then vulcanized in a steam-boiler, or in any proper manner, the close pressure of the sheets of metal giving the smooth, compact surface desired.

Having thus described my improvement, I shall state my claim as follows:

What I claim as my invention, and desire to have secured to me by Letters Patent, is—

As a new article of manufacture, machine belting or banding manufactured with surfaces of india-rubber or gutta-percha, and having surfaces which are as nearly as is practically possible perfectly smooth, as described.

DENNIS C. GATELY.

Witnesses:
   D. B. BEERS,
   W. W. PERKINS.